(12) United States Patent
Stieger et al.

(10) Patent No.: US 8,646,377 B2
(45) Date of Patent: Feb. 11, 2014

(54) THERMOBLOCK-BASED BEVERAGE PRODUCTION DEVICE WITH BREWING CHAMBERS

(75) Inventors: Michael Stieger, La Croix (CH); Heinz Eicher, Jona (CH)

(73) Assignee: Nestec S.A., Vevey (CH)

( * ) Notice: Subject to any disclaimer, the term of this patent is extended or adjusted under 35 U.S.C. 154(b) by 1653 days.

(21) Appl. No.: 11/531,894

(22) Filed: Sep. 14, 2006

(65) Prior Publication Data

US 2007/0062377 A1 Mar. 22, 2007

(30) Foreign Application Priority Data

Sep. 20, 2005 (EP) ..................................... 05020507

(51) Int. Cl.
*A47J 31/44* (2006.01)

(52) U.S. Cl.
USPC .................................. 99/279; 99/280; 99/282

(58) Field of Classification Search
USPC .......................................... 99/279, 280, 282
See application file for complete search history.

(56) References Cited

U.S. PATENT DOCUMENTS

| 4,287,817 A | * | 9/1981 | Moskowitz et al. | ............ 99/282 |
| 5,259,297 A | * | 11/1993 | Giuliano | ......................... 99/282 |
| 5,813,318 A | * | 9/1998 | Zanin et al. | ..................... 99/291 |
| 2005/0133202 A1 | * | 6/2005 | Jorgensen et al. | ............ 165/103 |

FOREIGN PATENT DOCUMENTS

| EP | 0502815 | 6/1991 |
| EP | 0502851 | 9/1992 |
| EP | 0577561 A1 | 1/1994 |
| FR | 2742646 | 12/1995 |

* cited by examiner

*Primary Examiner* — Alexandra Elve
(74) *Attorney, Agent, or Firm* — K&L Gates LLP

(57) ABSTRACT

A brewing-type beverage production device comprising at least one water reservoir, at least two thermoblocks respectively being in fluid connection with the water reservoir, at least brewing chambers, each of the brewing chambers being supplied with heated water from one of the thermoblocks, being adapted to contain a beverage ingredient and being connected with an outlet for draining a brewed beverage, the device furthermore comprising a hot water outlet being adapted to be selectively in fluid connection with the at least two thermoblocks.

19 Claims, 2 Drawing Sheets

THERMOBLOCK-BASED BEVERAGE PRODUCTION DEVICE WITH BREWING CHAMBERS

BACKGROUND

The present invention relates to brewing-type beverage production devices and a method for operating such brewing-type beverage production devices.

SUMMARY

Generally the invention relates to a thermoblock-based beverage production device, i.e. a device in which water is heated in a so-called thermoblock in order to produce hot water and/or steam. A thermoblock within the meaning of the present invention is a heat exchanger in which water is heated (e.g. by electric resistors) while it is pumped.

In contrast thereto in a boiler the heated water or steam is circulated out of the boiler only after the heating is finished. Generally boilers do have the disadvantage that the resulting system has a slower response as the thermal inertia is much higher.

On the other hand, thermoblocks consume a considerable amount of electric power while in operation.

A beverage production device according to the present invention is provided with several brewing chambers. A brewing chamber is an essentially enclosed chamber containing a beverage ingredient. When hot water (from the thermoblock) is pumped into the brewing chamber, it interacts with the beverage ingredient and as a product of the interaction, a beverage, i.e. a liquid comestible, is produced. Note that the present invention encompasses all kind of different interactions between the beverage ingredient and the water, such as for example extraction, dissolution, mixing with a concentrate etc.

At the same time, the beverage ingredient can be provided in different forms, such as e.g. in powdered, solid, semi-solid or liquid form.

EP 577 561 teaches a machine for delivering two brewed beverages (e.g. coffee) simultaneously, or alternatively one brewed beverage and steam or one brewed beverage and hot water. This known machine can present three separate boiler sets. A power control can be carried out by computational means to selectively deliver power to the two or three boilers.

It is the object of the present invention to propose a beverage production device offering to the user a more flexible range of products which can be delivered at the same time at more than one outlet of a beverage production device.

This object is achieved by means of the features of the independent claims. The depending claims develop further the central idea of the present invention.

According to a first aspect of the present invention, a brewing-type beverage production device comprises at least one water reservoir. Further on, the device comprises at least two thermoblocks which can be brought selectively in fluid connection with the at least one water reservoir. The device also comprises at least two brewing chambers, each of the brewing chambers being supplied with heated water from one of the thermoblocks, being adapted to contain a beverage ingredient and being connected to an outlet for draining a brewed beverage from the brewing chamber.

According to the present invention the beverage production device furthermore comprises a common hot water outlet, i.e. a hot water outlet which can be brought selectively in fluid connection with more than one thermoblocks.

As the hot water outlet is common to more than one thermoblock, the invention thus goes beyond a simple aggregation of several independent and parallel systems.

The beverage production device can comprise control means and valve means configured for selectively supplying hot water from a first thermoblock to the hot water outlet when one of the brewing chambers is being supplied with hot water from the respectively other thermoblock.

In order to do so the control means can monitor the current status of the beverage production device, in order to decide which of the at least two thermoblocks is not about to be used and can thus can be used for supplying hot water to the hot water outlet.

The beverage production device can comprise control means and valve means configured for selectively supplying the common hot water outlet with hot water simultaneously from the two thermoblocks when none of the brewing chambers are supplied with hot water from any of the thermoblocks.

Again, to this regard the control means can monitor the current status of the beverage production device. When the monitoring results in the decision that none of the thermoblocks is currently used for one of the brewing chambers, more than one thermoblock can be used to supply hot water to the hot water outlet thus increasing (e.g. doubling in case of two thermoblocks) the hot water flow rate.

The beverage production device optionally can furthermore comprise at least one additional steam-producing thermoblock for producing water steam to be supplied to an optional steam outlet. The steam outlet can be provided separately to the hot water outlet and the outlet for draining a brewed beverage.

The control means and valve means of the beverage production device can be configured to, upon user's input, selectively activate two thermoblocks out of the three thermoblocks such that hot water is selectively supplied at least to:
  the two brewing chambers, or
  one brewing chamber and the hot water outlet,
Optionally one brewing chamber and the steam outlet can be supplied with hot water from the thermoblocks.

As a further option the water outlet and the steam outlet can be provided with hot water from the thermoblocks.

Finally, hot water can be produced with an increased flow-rate.

This control thus increases the flexibility of the beverage production, as selectively at least the following products can be produced:
  two brewed beverages,
  one brewed beverage and hot water, and
  hot water with increased flow rate.
  Optionally, also the combination hot water and steam can be provided.

According to a further development, means can be provided for selectively connecting the steam-producing thermoblock with an evacuation outlet. Evacuating means can be arranged for selectively connecting the inlet side of the steam-producing thermoblock with the evacuation outlet.

According to a further aspect means can be provided for evacuating the at least two thermoblocks associated with the brewing chambers by selectively providing a fluid connection between the thermoblocks with a thermoblock-evacuating outlet.

The evacuating means for the at least two thermoblocks can thereby be arranged to respectively selectively provide a fluid connection between the inlet side of the thermoblocks and an evacuating outlet.

In other words, according to the present invention the evacuation of the thermoblocks, be it a steam-producing thermoblock or a thermoblock connected with a brewing chamber is preferably carried out from the inlet side of the thermoblocks.

In order to evacuate the at least two thermoblocks connected with the brewing chambers, valve means can be provided to selectively vent air through the hot water outlet and into the thermoblocks for emptying the thermoblocks.

In other words, according to this particular evacuation process for the thermoblocks, air is vented from the outlet side into the thermoblocks thus that any remaining water can be evacuated from the thermoblocks at the water inlet side.

According to a further aspect of the present invention a brewing-type beverage production device is proposed which contains at least one water reservoir and at least two thermoblocks, respectively being in fluid connection with the at least one water reservoir. At least two brewing chambers are provided, each of the brewing chambers being supplied with heated water from one of the thermoblocks, being adapted to contain a beverage ingredient and being connected with an outlet for draining a brewed beverage. According to the invention the device furthermore comprises thermoblock evacuating means designed for selectively providing a fluid connection between the inlet side of each thermoblock and the respective evacuating outlet.

Preferably the evacuating means can be designed and arranged in order to evacuate liquid water from the respective thermoblock.

A still further aspect of the present invention relates to a method for operating a brewing-type beverage production device. The device can comprise a thermoblock being supplied with water and generating steam by heating supplied water the method comprises the step of selectively connecting the inlet side of the steam-producing thermoblock with an evacuating outlet until a criterion representing the regular function of the thermoblock after starting the operation of the thermoblock is met.

In other words, when starting the operation of the steam-producing thermoblock, initially the inlet side of the steam-producing thermoblock (i. e. the side supplied with water from a water reservoir) is in fluid communication with an evacuation outlet. Once, e.g. electronic control means decide that a criteria indicating a stable-state function of the thermoblock is achieved, the fluid communication between the inlet side of the steam-producing thermoblock and the evacuation outlet is blocked.

The criterion can, for example, be a defined time period after starting the thermoblock and/or a predefined threshold temperature of the thermoblock. Correspondingly, the associated control means can be provided with a timer and/or with an input signal from a thermosensor of a thermoblock.

Valve means can be provided which, when opened connect the inlet side of the steam-producing thermoblock with an evacuation outlet.

Once the defined criterion is met, the valve means can be transferred into the closed state in which it serves as an over-pressure safety valve.

In other words, the valve means according to this aspect of the present invention do have a dual-use: In the start phase of the operation of the steam-producing thermoblock these valve means serve for an evacuation of inlet side of the thermoblock, while in this stable-state regular operation these valve means serve as over-pressure safety valves.

Additional features and advantages are described herein, and will be apparent from, the following Detailed Description and the figures.

BRIEF DESCRIPTION OF THE FIGURES

Further aspects, advantages and objects of the present invention will now become evident for the man skilled in the art when reading the following detailed explanation of an embodiment taken in conjunction with the figures of the enclosed drawing.

DETAILED DESCRIPTION

Figure 1:
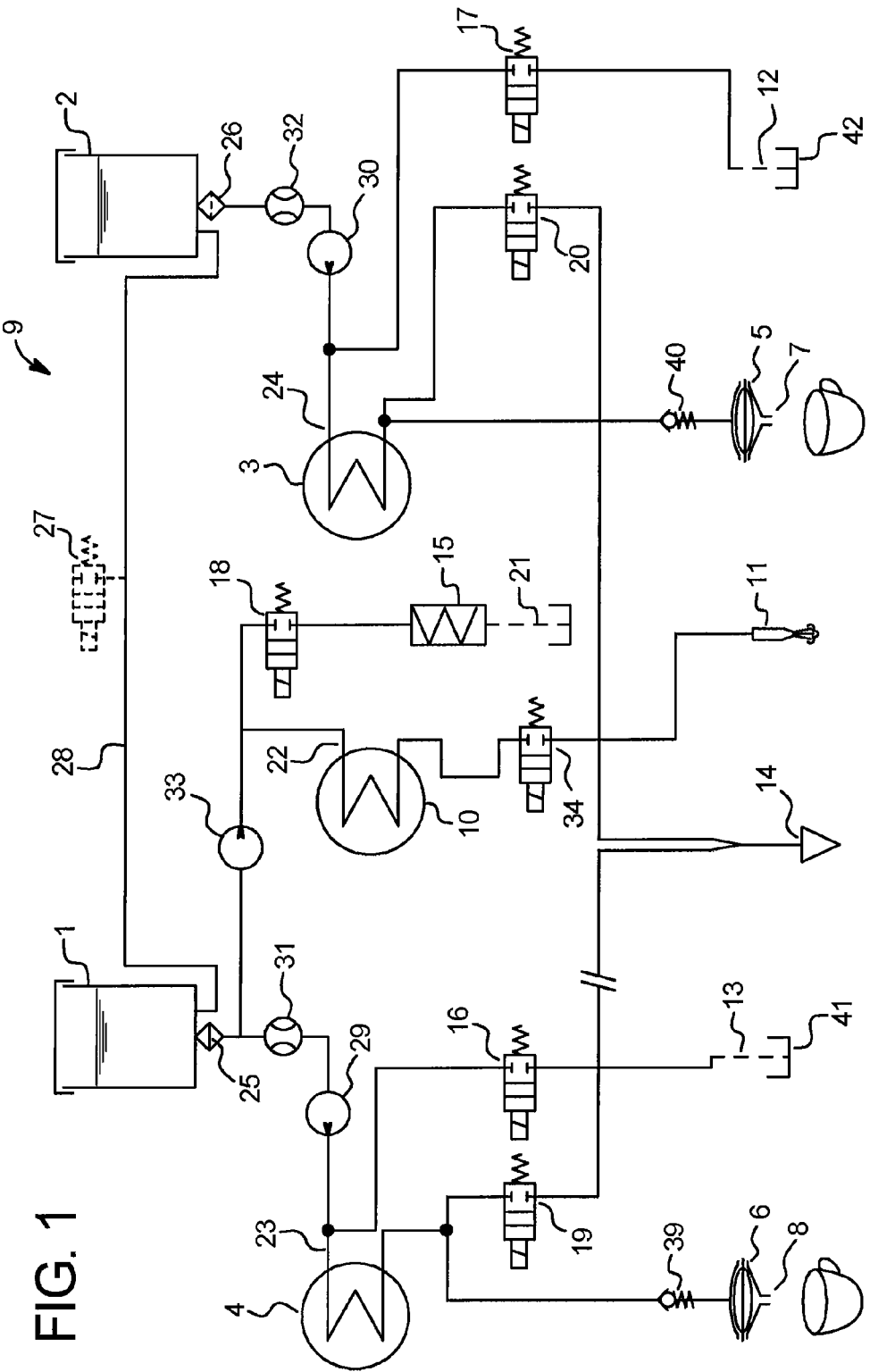
FIG. 1 shows a schematic scheme of a beverage production device.

In FIG. 1 the reference numeral 9 generally designates a beverage production device according to the present invention.

The beverage production device 9 is provided with at least two water reservoirs (tanks) 1, 2, respectively, provided with filter means 25, 26 at their outlet side. The water reservoirs 1, 2 can either be removable in order to be replenished at a remote location and/or be selectively brought in fluid connection with a tap water supply 27 (while remaining in place).

Note that the provision of separate water reservoirs 1, 2 is preferable for an easier replenishing of the water reservoirs 1, 2 by the user (reducing the weight of a single filled reservoir). It is also possible to provide only one water reservoir supplying all of the elements of the beverage production device 9 which will be explained in the following.

The water reservoirs 1, 2 are connected to each other by means of a conduit 28 such that it is sufficient to refill only one of the water reservoirs 1, 2 as the water levels of the two water reservoirs 1, 2 will be leveled-out through the communicating water conduit 28.

The outlets of the water reservoirs 1, 2 are respectively connected to pump means 29, 30. Flow meters 31, 32 can be provided for monitoring the flow from the water reservoirs 1 and 2, respectively, to the pumps 29 and 30, respectively, and thus also the water flow through the following stages (e.g. the thermoblocks as explained later-on).

In any case, by sensing the amount of water supplied to the thermoblocks a defined amount of water can be passed trough the thermoblocks in order to produce a defined amount of hot water, beverage and/or steam.

The pump 29 associated with the first water reservoir 1 supplies pressurised water to the inlet 23 of a first thermoblock 4, while the pump 30 being associated with the second water reservoir 2 supplies pressurised water to the inlet 24 of the second thermoblock 3.

As already explained in the opening section, such thermoblock is adapted to heat water using electrical resistors while it is flowing through a conduit in the thermoblock.

The outlet of the thermoblock 4 can be brought in fluid connection with a first brewing chamber 6 having a beverage outlet 8. The thermoblock 3 can be brought selectively in fluid connection with a second brewing chamber 5 having a beverage outlet 7.

Between the thermoblocks 3, 4 and the brewing chambers 5, 6 respectively a biased non-return valve 39, 40 is provided. These non-return valves 39, 40 block any flow from the brewing chambers 5, 6 towards the thermoblocks 3, 4. A liquid flow from the thermoblocks 3, 4 to the brewing chambers 5, 6 preferably occurs only after the pressure exceeds a defined threshold value, which threshold value is set by a spring-biasing force of the backstop valves 39, 40.

Each of the brewing chamber is designed to contain an ingredient from which a beverage, i.e. a liquid comestible can be produced.

Both the inlet side 23 of the thermoblock 4 and the inlet side 24 of the thermoblock 3 can be selectively put in fluid connection with evacuation outlet 13, 12, respectively, by actively controlling valve means 16, 17 in their respective opened states.

This control can e.g. be carried out by electronic control means (microprocessor etc.) which will be described later on with reference to FIG. 2. The evacuation can be carried out automatically and periodically, e.g. after the lapse of a defined time period.

Water from the first reservoir 1 can also be pressurised by a further pump 33 supplying pressurised water to an optional steam-producing thermoblock 10.

The outlet side of the steam-producing thermoblock 10 can be selective put in fluid connection with a steam outlet 11 when actively controlling the steam valve 34 in its opened state.

Additionally the inlet side 22 of the thermoblock 10 can be selectively put in fluid connection with (optional) condensing means 15 such that the inlet side 22 of the steam-producing thermoblock 10 is in fluid communication with an evacuation outlet 21.

To this regard an evacuation valve 18 can be actively opened and kept in the opened state.

As it is already been described above, each of the thermoblocks 3 and 4 can be used to supply (independently from each other) hot pressurised water to brewing chambers 5 and 6, respectively. In addition, the outlet of the thermoblocks 3, 4 can be selectively brought in fluid connection with a common hot water outlet 14, wherein to this regard valve control means 19, 20 are provided between the outlet side of the thermoblocks 3 and 4, respectively and the common hot water outlet 14.

Figure 2:
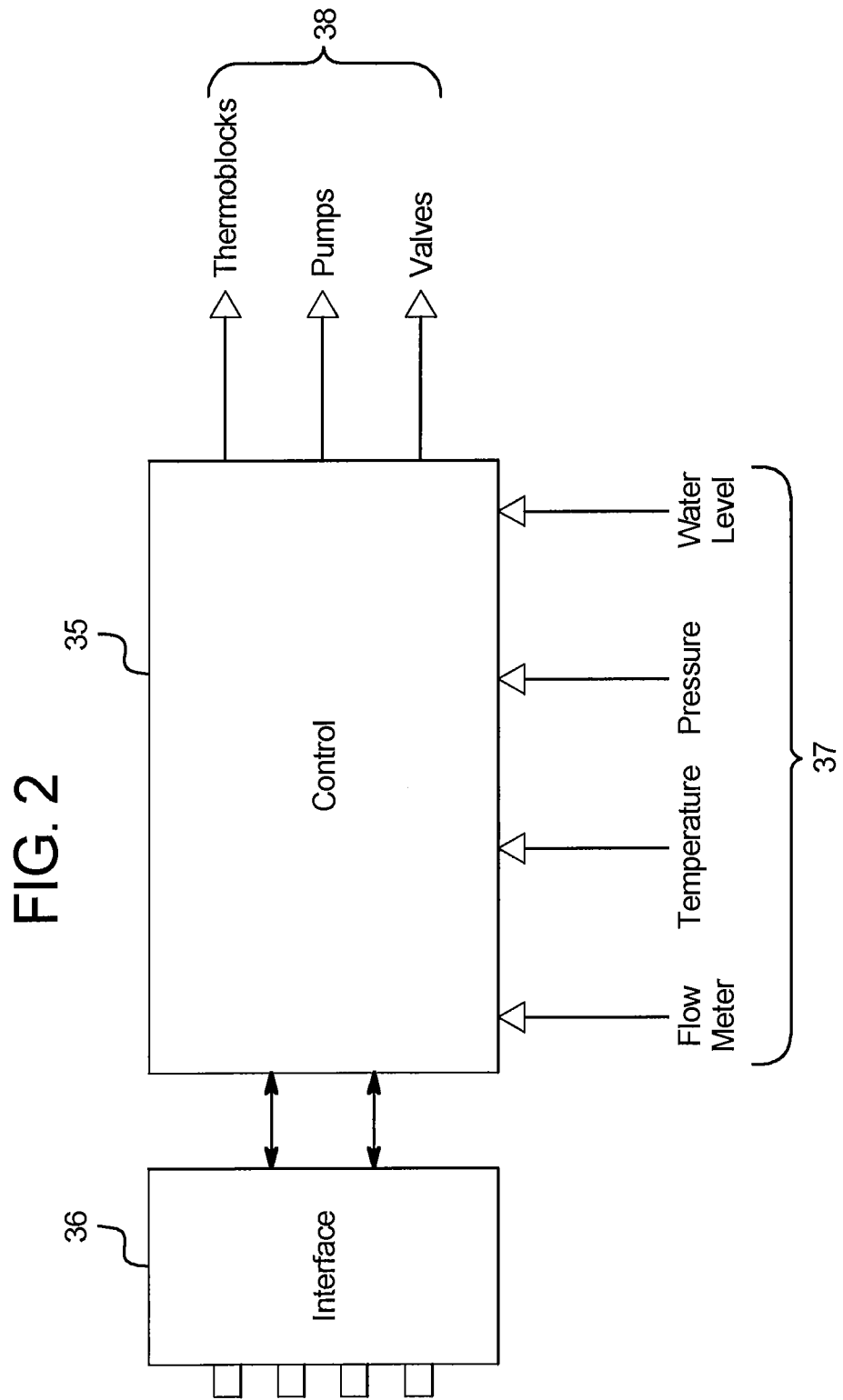
FIG. 2 schematically the control of implemented in such a device.

As shown in FIG. 2 electronic control means, such as for example a microprocessor controls the operation of the thermoblocks (heating), the pumps and the different valves as shown in FIG. 1.

The control means 35 can be provided with status monitoring signals 37 indicating the current status of different elements of the beverage production device 9 shown in FIG. 1 and as detected e.g. by suitable sensing means. These status monitoring signals 37 can be, for example, the temperatures of the thermoblocks, the flow-indicating signals from the flow meters, the pressure at the secondary side of the pumps as well as the water level in the water reservoirs 1, 2.

The operation of the beverage production device 9 shown in FIG. 1 can be carried by means of a user interface 36 through which a user can select the operation of the beverage production device. The user interface 36 can also comprise means to signal to the user the current status of the beverage production device 9.

The beverage production device 9 as shown in FIG. 1 presents an advantageous flexibility with regard to the products which can be obtained in a different outlet:

As two independent thermoblocks 3, 4 are connected respectively with a brewing chamber 5, 6, two brewed beverages can be obtained at the beverage outlet 7, 8 at the same time.

Further on, as each of the thermoblocks 3, 4 can be selective connected to the common hot water outlet 14, simultaneously a brewed beverage can be obtained at one of the beverage outlets 7, 8, while at the same time obtaining hot water at the hot water outlet 14.

To this regard the control shown 35 in FIG. 2 decides whether one of the thermoblocks 3, 4 is currently not in operation for supplying hot pressurised water to a brewing chamber and will then connect any unused thermoblock 3, 4 to the common hot water outlet 14 via actively controlling the hot water valve means 19 and 20, respectively. In case none of the thermoblocks 3, 4 is currently used for producing a brewed beverage, both thermoblocks 3, 4 can be brought in fluid connection with the common hot water outlet 14, thus enhancing the hot water flow rate at the outlet 14.

As has already been short explained above, each of the thermoblocks 3 and 4 for producing beverage products as well as the thermoblock 10 for producing steam can be evacuated, preferably at the inlet sides 22, 23 and 24, respectively.

Generally the evacuation of a thermoblock serves to reduce scale deposition in the serpentines of the thermoblocks. The evacuation can e.g. be started once a thermoblock has not been used for a defined time period.

According to the invention the evacuation is preferably carried out at the inlet sides 22, 23 and 24, respectively by opening the valves 16, 17 and 18, respectively. In order to provide for a proper flow of the evacuated water at the inlet side, the outlet sides of the thermoblocks 3, 4 respectively, can be vented by opening the associated valve at the outlet side, i. e. at least one of the valves 19 and 20. Thus, air will be sucked into the thermoblocks 3, 4 from the hot water outlet 14. The inventors have found out that it is actually more efficient to empty the thermoblock from the inlet side and at the same time venting air to the outlet side of the corresponding thermoblock.

In any case, the evacuation flow will be caused by gravitational forces. To this regard the evacuation outlet openings (and thus the drip trays 41, 42) are at a lower position than the inlet sides of the thermoblocks to be evacuated.

A further aspect of the present invention relates to the steam production carried out by the optional steam-producing thermoblock 10. When initiating a steam-production operation, at the beginning the control means 35 as shown in FIG. 2 will actively open valve 18, such that the inlet side 22 of the thermoblock 10 is in fluid connection with the optional condenser 15 and the drip tray 21 for evacuating the inlet side 22 of the steam-producing thermoblock 10. Only after a predefined criterion ismet, the control means will allow the valve 18 to close and will at the same time actively open the valve 34 such that a proper steam production can commence and steam will eventually be available at the steam outlet 11.

Note that the defined criterion can for example be a predefined time period after initiating the steam production operation and/or a threshold temperature value. As long as this time period is not expired and/or the thermoblock 10 has not yet reached its operation threshold temperature value, the inlet side will be kept in an evacuation state and the outlet side. e. the valve 134, will be closed. Thus, during the warming-up of the steam producing thermoblock 10 no water etc. will be evacuated from the steam outlet 11. Only after the warming-up of the steam-producing thermoblock 10 is finished, a proper amount (volume) of steam at a defined temperature will be obtained at the steam outlet 11.

A typical threshold temperature can be, for example, 100 to 105° C. and only after the thermoblock 10 will reach such threshold temperature, the valve 18 will close and steam system is ready to use. The temperature can be sensed e.g. using a NTC element.

From the above, it is clear that the valve 18 serves as an evacuation valve for the steam-producing thermoblock 10. During this warming-up period this valve 18 is actively controlled in the opened state. On the other hand, once the thermoblock 10 is in its proper steam-producing function, the valve 18 is in its closed state. In this state it can serve as an over-pressure protection valve, which can passively be opened upon the pressure in the thermoblock 10 exceeding a threshold value, such that over-pressure 10 can be released to the drip tray 21.

During the operation the thermoblock 10 will not be vented or evacuated (in contrast to the thermoblocks associated with the brewing chambers). The hot steam always remains in the thermoblock 10 such that hot steam is always available on demand.

The thermoblock 10 will only be vented at the start of its operation. This is to avoid that any liquid sucked-in and condensed inside the thermoblock 10 after the cooling-down once the thermoblock 10 is switched off will produce unwanted excess steam.

In principle, it can be possible to produce the steam via the thermoblock 10 independently, from any hot water or beverage producing action by activating the thermoblock 4. Therefore, in principle the steam production can be carried in addition to any beverage/beverage, beverage/hot water or hot water (double flow rate) operation.

On the other hand, a thermoblock has a relatively high power consumption (e. g. 1100 Watt), such that limitations of the energy supply can lead to the requirement that only two of the three thermoblocks 3, 4 and 10 as shown in FIG. 1 can be operated simultaneously.

In case such limitations from the energy supply exists, upon users input the following operation can thus be carried out:

Production of two beverages using two brewing chambers,
Production of one beverage and hot water,
Production of one beverage and steam,
Production of hot water with increased flow rate, and
Production of hot water and steam.

REFERENCE NUMERALS

1 water reservoir
2 water reservoir
3 thermoblock (i.e. flow-type water heater, in which water is heated in channels) for brewing chamber
4 thermoblock for brewing chamber
5 brewing chamber
6 brewing chamber
7 beverage outlet
8 beverage outlet
9 beverage brewing machine (e.g. coffee machine)
10 steam thermoblock
11 steam outlet
12 evacuating outlet
13 evacuating outlet
14 hot water outlet
15 condenser
16 evacuating means (valve 2)
17 evacuating means (valve 5)
18 valve 6
19 valve 1
20 valve 4
21 evacuation outlet of the steam-producing thermoblock
22 inlet side of the steam-producing thermoblock
23 inlet side of thermoblock 3
24 inlet side of thermoblock 4
25 filter
26 filter
27 tab water supply
28 water conduit
29 pump means
30 pump means
31 flow meter
32 flow meter
33 pump for steam-producing thermoblock
34 evacuation/overpressure valve of the steam-producing thermoblock
35 control means
36 user interface
37 monitoring signals supplied to the control means
38 control signals generated by the control means
39 biased backstop valve
40 biased backstop valve
41 drip tray
42 drip tray It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A brewing-type beverage production device, comprising:
   at least one water reservoir,
   at least two thermoblocks in fluid connection with the water reservoir,
   at least two brewing chambers, each of the brewing chambers being supplied with heated water from one of the thermoblocks, adapted to contain a beverage ingredient and connected to an outlet for draining a brewed beverage, and
   a hot water outlet located downstream from the at least two thermoblocks and being in fluid connection with each of the at least two thermoblocks.

2. The beverage production device according to claim 1, comprising control means and valve means for supplying hot water from one of the thermoblocks to the hot water outlet when one of the brewing chambers is being supplied with hot water from another thermoblock.

3. The beverage production device according to claim 1, comprising control means and valve means for supplying the hot water outlet with hot water simultaneously from the at least two thermoblocks when none of the brewing chambers are being supplied with hot water from any of the thermoblocks.

4. The beverage production device according to claim 1, comprising control means and valve means configured, upon a user's input from an interface, to selectively activate two of the thermoblocks such that hot water is selectively supplied to either two of the brewing chambers, or one brewing chamber and the hot water outlet.

5. The beverage production device according to claim 1, comprising at least one steam-producing thermoblock for producing water steam to be supplied to a steam outlet.

6. The beverage production device according to claim 5, wherein evacuating means are provided for evacuating the steam-producing thermoblock by selectively connecting it with an evacuation outlet.

7. The beverage production device according to claim 6, wherein the evacuating means are arranged for selectively connecting an inlet side of the steam-producing thermoblock with the evacuation outlet.

8. The beverage production device according to claim 5, comprising control means and valve means configured, upon a user's input from an interface, to selectively activate two of the thermoblocks such that hot water is selectively supplied to two of the brewing chambers, one brewing chamber and the hot water outlet, or one brewing chamber and the steam outlet.

9. The beverage production device according to claim 8, wherein hot water can be additionally supplied to the hot water outlet and the steam outlet.

10. The beverage production device according to claim 1, wherein evacuating means are provided for evacuating the at least two thermoblocks by selectively providing a fluid connection between the thermoblocks with an evacuating outlet.

11. The beverage production device according to claim 10, wherein the evacuating means for the at least two thermoblocks are arranged to respectively selectively provide a fluid connection between the inlet side of the thermoblocks and an evacuating outlet.

12. The beverage production device according to claim 10, wherein in order to evacuate the at least two thermoblocks, valve means are provided to selectively vent air through the hot water outlet and into the thermoblocks for emptying the thermoblocks.

13. A brewing-type beverage production device, comprising:
   at least one water reservoir,
   at least two thermoblocks respectively being in fluid connection with the water reservoir,
   at least two brewing chambers, each of the brewing chambers being supplied with heated water from one of the thermoblocks, adapted to contain a beverage ingredient and connected with an outlet for draining a brewed beverage, and
   thermoblock evacuating means designed for selectively providing a fluid connection between an inlet side of each thermoblock and a respective evacuating outlet, wherein the fluid connection does not pass through the at least two thermoblocks.

14. The beverage production device according to claim 13, wherein the evacuating means are designed and arranged in order to evacuate liquid water from the respective thermoblock.

15. A method for operating a brewing-type beverage production device, the device comprising a thermoblock being supplied with water and generating steam by heating supplied water, comprising the steps of: selectively providing a fluid connection between an inlet side of the thermoblock and an evacuation outlet until a criterion representing a regular function of the thermoblock after a start of the operation of the thermoblock is met, wherein the fluid connection does not pass through the thermoblock.

16. The method according to claim 15, wherein the criterion is selected from the group consisting of a defined time period after starting the thermoblock and a predefined threshold temperature of the thermoblock.

17. The method according to claim 15, wherein a valve means, when opened, connects the inlet side of the steam-producing thermoblock with an evacuation outlet.

18. The method according to claim 17, wherein, once the criterion is met, the valve means is actively transferred into the closed state in which it serves as a over-pressure safety valve.

19. A device comprising:
   a water reservoir,
   two thermoblocks in fluid connection with the water reservoir,
   two brewing chambers, each of the brewing chambers receiving heated water from at least one of the thermoblocks, containing a beverage ingredient and being connected to an outlet for draining a brewed beverage, and
   a hot water outlet located downstream from the two thermoblocks and being in fluid connection with the thermoblocks.

* * * * *